US012041111B2

(12) United States Patent
Mortensen et al.

(10) Patent No.: US 12,041,111 B2
(45) Date of Patent: *Jul. 16, 2024

(54) METHODS AND APPARATUS TO MONITOR STREAMING MEDIA

(71) Applicant: The Nielsen Company (US), LLC, New York, NY (US)

(72) Inventors: Jose Mortensen, Tampa, FL (US); Alan Bosworth, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,609

(22) Filed: Mar. 14, 2022

(65) Prior Publication Data
US 2022/0210215 A1 Jun. 30, 2022

Related U.S. Application Data

(63) Continuation of application No. 16/719,944, filed on Dec. 18, 2019, now Pat. No. 11,277,461.

(51) Int. Cl.
*H04N 21/2662* (2011.01)
*H04L 65/65* (2022.01)
*H04L 65/80* (2022.01)

(52) U.S. Cl.
CPC ............ *H04L 65/80* (2013.01); *H04L 65/65* (2022.05); *H04N 21/2662* (2013.01)

(58) Field of Classification Search
CPC ..... H04L 65/80; H04L 65/608; H04L 65/604; H04L 65/60; H04N 21/2402; H04N 21/4402; H04N 21/2662
See application file for complete search history.

(56) References Cited

U.S. PATENT DOCUMENTS

| 5,543,853 | A |   | 8/1996 | Haskell et al. |
| 5,808,722 | A | * | 9/1998 | Suzuki ............... G11B 27/105 386/E5.017 |

(Continued)

FOREIGN PATENT DOCUMENTS

| JP | 2019102837 A | 6/2019 |
| KR | 20180095251 A | 8/2018 |
| KR | 101988613 B1 | 6/2019 |

OTHER PUBLICATIONS

Reed et al., "Identifying HTTPS-Protected Netflix Videos in Real-Time," Department of Electrical Engineering and Computer Science, United States Military Academy at West Point, Mar. 22-24, 2017, 8 pages.

(Continued)

*Primary Examiner* — Dhairya A Patel
*Assistant Examiner* — Vinh Nguyen

(57) ABSTRACT

Methods, apparatus, systems and articles of manufacture are disclosed to monitor streaming media. An example apparatus includes memory, instructions in the apparatus, and processor circuitry to execute the instructions to: calibrate video data based on audio data, the video data and the audio data associated with a media stream, generate a signature representative of the media stream based on the calibrated video data, compare the signature to a signature database to identify a matching signature in the signature database; and credit media corresponding to the matching signature as being viewed.

17 Claims, 10 Drawing Sheets

(56) References Cited

U.S. PATENT DOCUMENTS

| | | | |
|---|---|---|---|
| 9,136,965 B2 | 9/2015 | Topchy et al. | |
| 9,276,976 B2 | 3/2016 | Appelquist et al. | |
| 9,665,646 B1 | 5/2017 | Belan et al. | |
| 9,674,255 B1* | 6/2017 | Tiwary | H04L 65/762 |
| 10,681,104 B1* | 6/2020 | Wu | H04N 21/26258 |
| 10,735,554 B1* | 8/2020 | Jorgovanovic | H04L 65/612 |
| 10,887,672 B1 | 1/2021 | Wu et al. | |
| 10,904,311 B1* | 1/2021 | Surazski | H04L 65/1066 |
| 11,277,461 B2 | 3/2022 | Mortensen et al. | |
| 11,547,366 B2* | 1/2023 | Sane | A61B 5/7246 |
| 2002/0186768 A1 | 12/2002 | Dimitrova et al. | |
| 2002/0188945 A1 | 12/2002 | McGee et al. | |
| 2004/0003394 A1 | 1/2004 | Ramaswamy | |
| 2007/0058647 A1* | 3/2007 | Bettis | H04L 47/10 375/E7.198 |
| 2007/0081562 A1 | 4/2007 | Ma | |
| 2007/0220118 A1* | 9/2007 | Loyer | G11B 27/105 709/219 |
| 2007/0299983 A1* | 12/2007 | Brothers | H04N 21/2368 725/105 |
| 2008/0304571 A1* | 12/2008 | Tsukagoshi | H04N 21/43072 348/E5.002 |
| 2009/0222873 A1* | 9/2009 | Einarsson | H04N 21/23406 725/115 |
| 2009/0232129 A1 | 9/2009 | Wong et al. | |
| 2010/0005186 A1* | 1/2010 | Yamada | H04N 21/4394 709/231 |
| 2010/0238792 A1* | 9/2010 | Togo | H04N 21/84 370/216 |
| 2011/0082945 A1* | 4/2011 | Myers | H04N 21/4621 709/231 |
| 2011/0188704 A1 | 8/2011 | Radhakrishnan et al. | |
| 2011/0205427 A1* | 8/2011 | Wang | G10L 21/04 348/E7.003 |
| 2011/0261257 A1 | 10/2011 | Terry et al. | |
| 2013/0166691 A1* | 6/2013 | Robinson | H04N 21/43072 709/219 |
| 2013/0169863 A1* | 7/2013 | Smith | H04N 5/04 348/441 |
| 2014/0142958 A1 | 5/2014 | Sharma et al. | |
| 2014/0149596 A1* | 5/2014 | Emerson, III | H04L 65/70 709/231 |
| 2014/0323036 A1* | 10/2014 | Daley | H04H 20/38 455/3.06 |
| 2015/0012937 A1 | 1/2015 | Yamagishi | |
| 2015/0128197 A1* | 5/2015 | Lo | H04N 21/23116 725/100 |
| 2015/0172727 A1 | 6/2015 | Annamraju et al. | |
| 2015/0181269 A1* | 6/2015 | McMillan | H04N 21/23418 725/19 |
| 2015/0289013 A1* | 10/2015 | Nelson | H04N 21/23418 725/19 |
| 2016/0055420 A1 | 2/2016 | Karanam et al. | |
| 2016/0066005 A1 | 3/2016 | Davis et al. | |
| 2016/0156731 A1 | 6/2016 | Wang et al. | |
| 2016/0210356 A1* | 7/2016 | Kariyappa | G06F 16/683 |
| 2016/0286285 A1 | 9/2016 | Geyzel et al. | |
| 2017/0048566 A1* | 2/2017 | Srinivasan | H04N 21/251 |
| 2017/0063702 A1* | 3/2017 | Mani | H04L 65/1101 |
| 2017/0195725 A1* | 7/2017 | O'Hern | H04N 21/44008 |
| 2017/0257412 A1 | 9/2017 | Lohmar et al. | |
| 2017/0289591 A1* | 10/2017 | Blohowiak | H04N 21/2402 |
| 2018/0077445 A1 | 3/2018 | Puntambekar et al. | |
| 2018/0205974 A1 | 7/2018 | Kawaguchi et al. | |
| 2018/0227616 A1 | 8/2018 | Ren et al. | |
| 2018/0246981 A1 | 8/2018 | Wei et al. | |
| 2018/0278991 A1* | 9/2018 | Tapse | H04N 21/84 |
| 2018/0332326 A1 | 11/2018 | Yamagishi | |
| 2019/0014050 A1 | 1/2019 | Wang et al. | |
| 2019/0182488 A1 | 6/2019 | Owen | |
| 2019/0243604 A1* | 8/2019 | Millington | G06F 3/0482 |
| 2019/0379931 A1 | 12/2019 | Stojancic et al. | |
| 2020/0037017 A1 | 1/2020 | Nilsson | |
| 2020/0067859 A1* | 2/2020 | Katis | H04M 3/53 |
| 2020/0311433 A1* | 10/2020 | Oz | H04N 21/44008 |
| 2020/0413130 A1* | 12/2020 | Yin | H04N 21/44008 |
| 2020/0413160 A1* | 12/2020 | Yin | H04N 21/4402 |
| 2021/0194947 A1 | 6/2021 | Mortensen et al. | |
| 2022/0210215 A1 | 6/2022 | Mortensen et al. | |

OTHER PUBLICATIONS

Anderson et al., "Detecting Encrypted Malware Traffic (Without Decryption)," Cisco Blogs, [https://blogs.cisco.com/security/detecting-encrypted-malware-traffic-without-decryption], Jun. 23, 2017, 11 pages.

Anderson et al., "Identifying Encrypted Malware Traffic with Contextual Flow Data," [http://dx.doi.org/10.1145/2996758.2996768], AISec' 16, Oct. 28, 2016, 12 pages.

Anderson et al., "Machine Learning for Encrypted Malware Traffic Classification: Accounting for Noisy Labels and Non-Stationarity," published Aug. 2017 in KDD 2017 Applied Data Science Paper, pp. 1723-1732, 10 pages.

Anderson et al., "Deciphering Malware's use of TLS (without Decryption)," [https://arxiv.org/abs/1607.01639], Jul. 6, 2016, 15 pages.

Dierks et al., "The Transport Layer Security (TLS) Protocol Version 1.2," [https://tools.ietf.org/html/rfc5246], Dec. 17, 2019, 105 pages.

Github, "A package for capturing and analyzing network flow data and intraflow data, for network research, forensics and security monitoring," [https://github.com/cisco/joy], Dec. 17, 2019, 5 pages.

Mortensen, "Minute to Minute Tracking of Video Content on HyperText Transfer Protocol Secure (HTTPS) Connections," White Paper, published Mar. 20, 2018, in connection with The Nielsen Company (US), LLC., 12 pages.

United States Patent and Trademark Office, "Non-Final Office Action," issued Mar. 6, 2023, in connection with U.S. Appl. No. 17/694,609, 27 pages.

International Searching Authority, "Search Report and Written Opinion," issued Apr. 8, 2021, in connection with International Patent Application No. PCT/US2020/065443, 7 pages.

United States Patent and Trademark Office, "Non-Final Office Action," issued Jan. 21, 2021, in connection with U.S. Appl. No. 16/719,944, 16 pages.

United States Patent and Trademark Office, "Final Office Action," issued May 3, 2021, in connection with U.S. Appl. No. 16/719,944, 16 pages.

United States Patent and Trademark Office, "Notice of Allowance and Fee(s) Due" issued Nov. 3, 2021, in connection with U.S. Appl. No. 16/719,944, 13 pages.

Fenet et al., "A Scalable Audio Fingerprint Method With Robustness to Pitch-Shifting", Institut TELECOM, TELECOM ParisTech, CNRS-LTCI, Paris, France, 2011, 6 pages.

Zhu et al., "A Novel Audio Fingerprinting Method Robust to Time Scale Modification and Pitch Shifting", Firenze, Italy, Oct. 2010, 4 pages.

International Bureau, "International Preliminary Report on Patentability", issued in connection with International Patent Application No. PCT/US2020/065443 on May 17, 2022, 5 pages.

* cited by examiner

METHODS AND APPARATUS TO MONITOR STREAMING MEDIA

RELATED APPLICATION

This patent arises from a continuation of U.S. patent application Ser. No. 16/719,944, (now U.S. Pat. 11,277,461), which was filed on Dec. 18, 2019. U.S. patent application Ser. No. 16/719,944 is hereby incorporated herein by reference in its entirety. Priority to U.S. patent application Ser. No. 16/719,944 is hereby claimed.

FIELD OF THE DISCLOSURE

This disclosure relates generally to media monitoring, and, more particularly, to methods and apparatus to monitor streaming media.

BACKGROUND

In recent years, streaming of media using over-the-top (OTT) devices, mobile devices, etc. has become increasingly common. In general, streaming involves receiving and downloading media from a content provider. The media usually consists of video and/or audio and is temporarily saved to the streaming device during presentation. Typically, a presentation of the media begins before the entirety of the media is downloaded (e.g., the media is played as it downloads, the media is buffered and played from the buffer as a sufficient amount of media is received, etc.). There have been increasing efforts by media providers to protect consumer privacy by encrypting the media, which obfuscates the media being streamed so that the media cannot be intercepted by third parties or intermediate devices.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
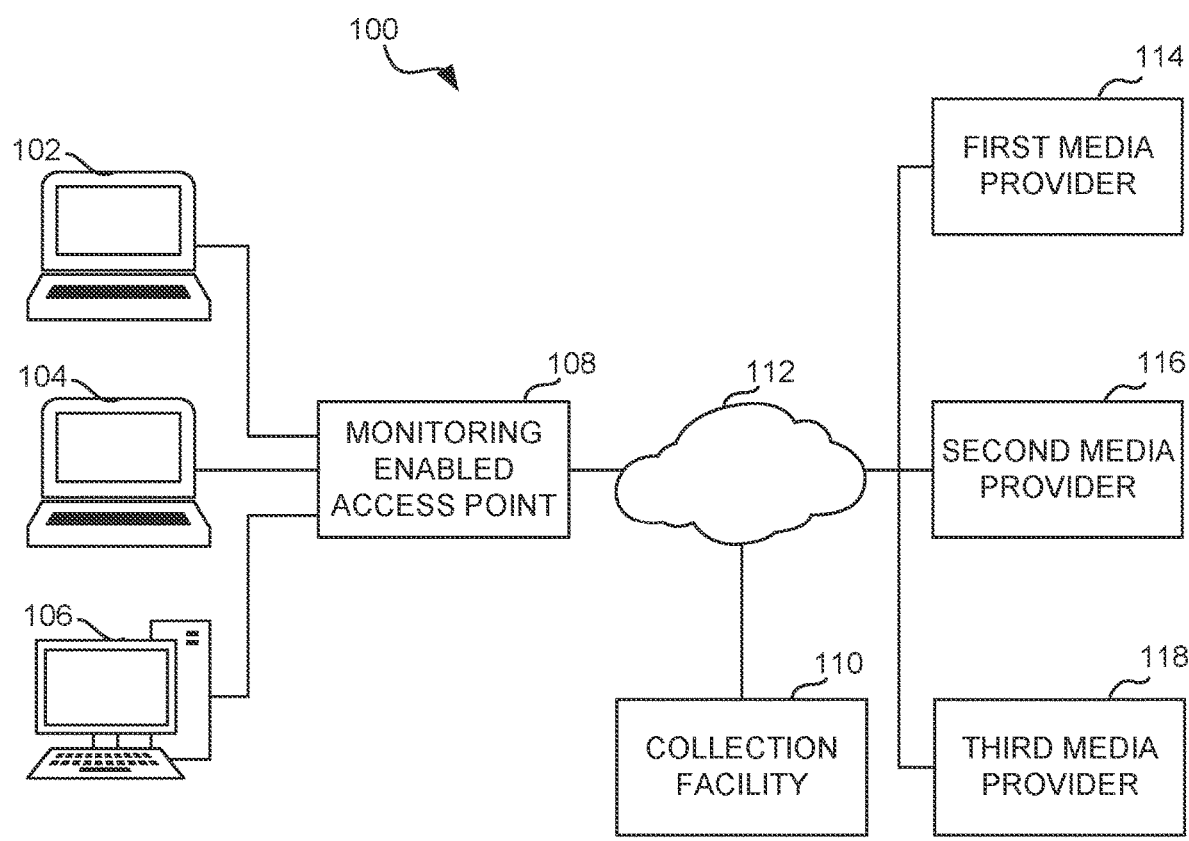
FIG. 1 is a schematic illustration of an example streaming media monitoring system constructed in accordance with teachings of this disclosure to monitor buffered media.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The use of streaming services on media devices such as over-the-top (OTT) devices, mobile devices, etc. in recent years has increased. In many streaming systems, a media device makes repeated requests for video frames and audio data to be presented, often based on multiple calls to a hypertext transfer protocol secure (HTTPS) application programming interface (API).

There has been an increasing effort by media providers to protect consumer privacy, including what consumers view. Privacy measures often include encrypting the media files that users download when streaming media. While this encryption increases consumer privacy, it also complicates the collection of streaming information performed by independent audience measurement entities (AMEs).

Common encryption techniques (e.g., HTTPS encryption) prevent AMEs from collecting payload information from HTTPS protocol communications and request strings. However, the source internet protocol (IP) and port, target IP and port, and transport layer security (TLS) headers and protocol remain visible to AMEs. This allows AMEs to collect data on when media files are downloaded, including the size of the data file. Media files often include both video data (e.g., video frames) and audio data. However, due to encryption, it may be difficult to distinguish audio HTTPS requests from video HTTPS requests. Video frames of media data files are often encoded in a variable bitrate. Therefore, depending on the video complexity and the scene it actually displays, video frames may produce a unique signature of each video sequence. These signatures can be analyzed by AMEs to identify the particular media being streamed.

Streaming allows users to view media before the entire video and audio data of the media is downloaded from the media provider. Streaming of media commonly utilizes buffering. As used herein, a buffer is a memory that temporarily stores the media being streamed. The process of buffering refers to a streaming device storing media in a buffer as the media is received and then playing the media from the buffer. There is often a large burst of data (e.g., increased buffering) when media initially begins playing and/or if a user skips to an uncached position.

Buffering can impede or delay the use of media transmission data for media signatures. That is, the signatures of the variable bitrate timing data for data packets obtained when buffering is employed cannot be calculated or used until buffering has ended and minute to minute playback has started. For example, a reference signature generated for variable bitrate video retrieved during unbuffered playback will not match the same variable bitrate video retrieved in bursts for buffered playback because the unique timing of the variable bitrate video will not be maintained. However, audio data is often encoded using a constant bitrate, resulting in audio frames that are constant in size and streamed as regular intervals. Thus, the identified audio frames may be used to reconstruct the timing of the media to remove the effects of the buffering on the variable bitrate video.

Methods and apparatus disclosed herein monitor streaming media by calibrating variable bitrate video data to time data. In operation, a monitoring enabled access point, meter, etc. may be used to perform in-home sniffing (e.g., media data file size, timing, etc.). An AME (e.g., a collection facility) may calibrate the variable bitrate video data using the constant bitrate audio data, thus removing the effects of the buffering on the variable bitrate video. In some examples, the AME may generate a signature based on the calibrated variable bitrate video data and identify the media being streamed.

FIG. 1 is a schematic illustration of an example streaming media monitoring system 100 suitably constructed in accordance with teachings of this disclosure to monitor buffering media. The example streaming media monitoring system 100 includes media streaming devices 102, 104, and 106 for presentation of media. In some examples, the media streaming devices 102, 104, and 106 are capable of directly presenting media (e.g., via a display) while, in some other examples, the media devices present the media on separate media presentation equipment (e.g., speakers, a display, etc.). For example, the media streaming devices 102 and 104 of the illustrated example are laptops and the media streaming device 106 of the illustrated example is a desktop, and thus, capable of presenting media (e.g., via an integrated display and speakers). While the illustrated example of FIG. 1 includes three media streaming devices, examples disclosed herein are not limited thereto. For example, there can be any combination and number of both laptops and desktops. In the examples disclosed herein, media streaming devices can also include mobile devices (e.g., smartphones, tablets, etc.) and OTT devices (e.g., smart televisions, gaming consoles, etc.).

The illustrated example of the streaming media monitoring system 100 of FIG. 1 includes an example monitoring enabled access point 108, an example collection facility 110, and example network 112. To receive and analyze buffered media, the example streaming media monitoring system 100 includes an example monitoring enabled access point 108 and an example collection facility 110. The monitoring enabled access point 108 analyzes network communications of buffered media including encoded video and audio data. In some examples, the monitoring enabled access point 108 is implemented by a network meter access point, a router, a switch, a embedded computing device, etc.

The collection facility 110 of the illustrated example is a server that collects and processes buffered media from the monitoring enabled access point 108 to generate calibrated media (e.g., calibrate the timing of video data based on audio data of the media data file). The collection facility 110 generates a signature based on the buffered media communications. In some examples, the collection facility 110 is a computing server. The collection facility 110 may also be implemented by a collection of servers (e.g., a server farm) to perform cluster computing. Additionally or alternatively, the collection facility 110 may be implemented by a cloud server to perform cloud computing.

The example network 112 of the illustrated example of FIG. 1 is the Internet. However, the example network 112 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 112 enables the example monitoring enabled access point 108 to be in communication with the example collection facility 110, the example first media provider 114, the example second media provider 116, and the example third media provider 118. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The illustrated example of FIG. 1 includes the example first media provider 114, the example second media provider 116, and the example third media provider 118 (also referred to as "content provider"). The example media providers 114-118 are servers providing Internet media (e.g., web pages, audio, videos, images, etc.) to the example media streaming devices 102, 104, 106. The example media providers 114-118 may be implemented by any provider(s) of media such as a digital broadcast provider (cable television service, fiber-optic television service, etc.) and/or an on-demand digital media content provider (e.g., Internet streaming video and/or audio services such as Netflix®, YouTube®, Hulu®, Pandora®, Last.fm®,) and/or any other provider of streaming media services. In some other examples, the media providers 114-118 are a host for web site(s). Additionally or alternatively, the media provider(s) 114-118 may not be on the Internet. For example, one or more of the media providers 114-118 may be on a private and/or semi-private network (e.g., a LAN, a virtual private network) to which the example media streaming device(s) 102, 104, and 106 connect. While the illustrated example of FIG. 1 includes three media providers 114-118, examples disclosed herein can include any number and combination of media providers.

Figure 2:
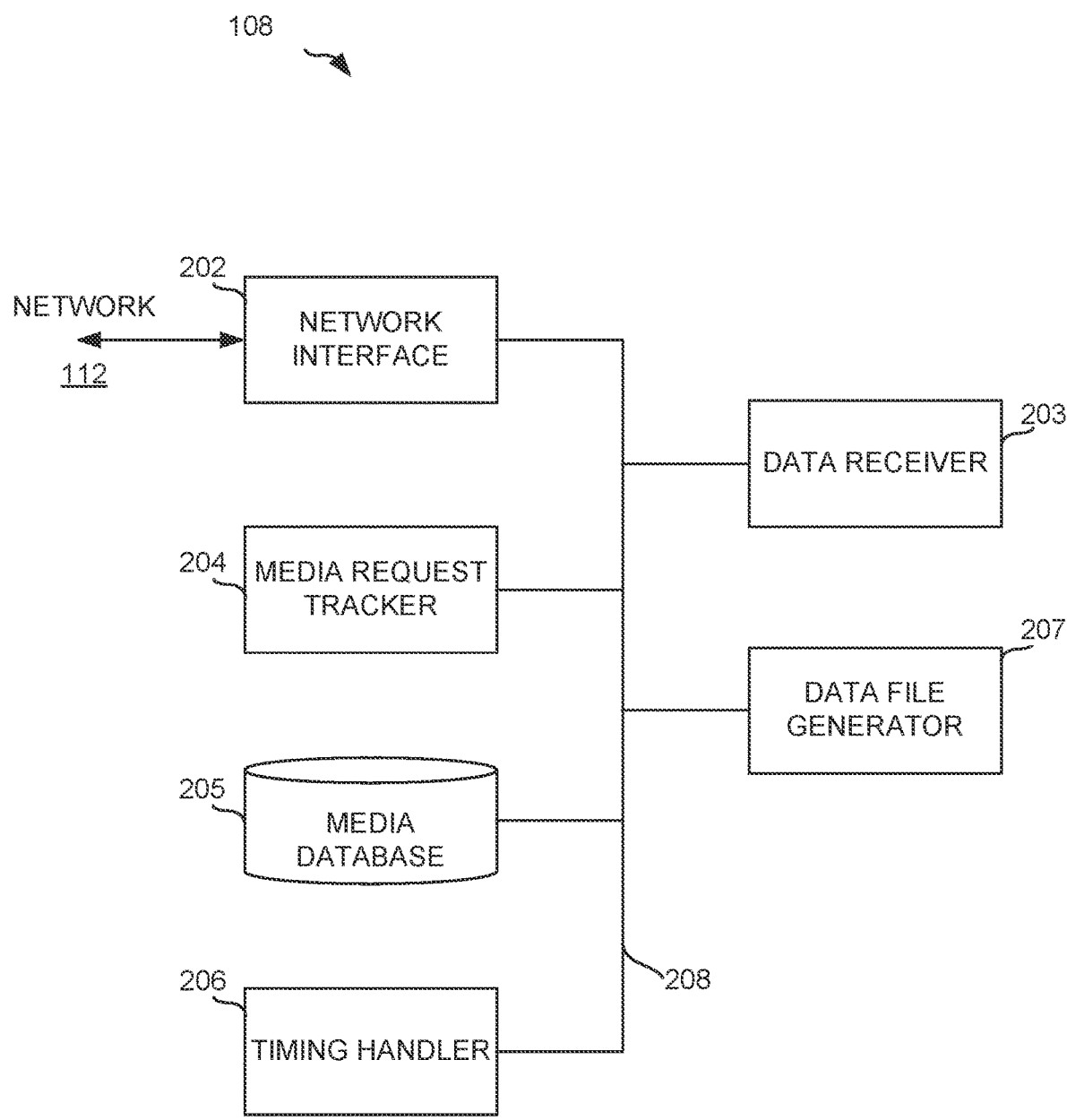
FIG. 2 is a schematic illustration of an example implementation of the monitoring enabled access point of FIG. 1 to perform in-home sniffing in accordance with teachings of this disclosure.

FIG. 2 is a schematic illustration of an example implementation of the monitoring enabled access point 108 of FIG. 1 to perform in-home sniffing in accordance with the teachings of this disclosure. The example monitoring enabled access point 108 is equipped with an example network interface 202 and an example data receiver 203. The example monitoring enabled access point 108 is also configured with an example media request tracker 204 and an example timing handler 206, both with access to an example media database 205. The example monitoring enabled access point 108 is also equipped with an example data file generator 207. The aforementioned structure and/or software (depending on the manner of implementation to track buffering video data) of FIG. 2 is communicatively connected (and/or interconnected) by an example monitoring enabled access point bus 208.

The example network interface 202 of the illustrated example of FIG. 2 is communicatively connected to the example network 112 of FIG. 1. The example network interface 202 provides connection between the example media streaming devices 102-106 and the example network 112. In some examples, the example network interface 202 is implemented by hardware (e.g., a network interface card). In further examples, the example network interface 202 is implemented by software.

The example data receiver 203 of the illustrated example of FIG. 2 receives media network data files from the example network 112, and/or the example media providers 114-118. For example, the example data receiver 203 receives network traffic (e.g., media data request from the example media streaming devices 102-106, media data packets from the example media providers 114-118, etc.) transmitted on the network 112. In some examples, the example data receiver 203 receives wireless radio signals (e.g., Wi-Fi signals). In some examples, the example data receiver 203 receives digital signals through wired media.

The example media request tracker 204 of the illustrated example of FIG. 2 obtains and saves the source IP and/or port and the destination IP and/or port of media requests from the example media streaming devices 102-106. The example media request tracker 204 also determines the amount of data in the media request (e.g., bitrate of video data and bitrate of audio data).

The example media request tracker 204 may also identify the audio requests included in the media requests (e.g., distinguish the audio requests from the video requests). For example, the media request tracker 204 may utilize metadata and characteristics of network communications corresponding to the media to distinguish audio and video requests. In some examples, the media request tracker 204 may analyze the source and/or destination ports and/or IPs corresponding to detected network communications to identify differences among communications (e.g., a reversal between the source and destination ports and/or IPs) that are indicative of communications from two different threads (e.g., a first thread retrieving audio data and a second thread retrieving video data). Additionally or alternatively, the media request tracker 204 may identify when a first audio request ends and a second audio request begins based on detecting a reset of the TLS protocol. Alternatively, any other past, present, or future technique for distinguishing network communications associated with the audio from network communications associated with the video may be utilized.

The example media request tracker 204 is implemented by a logic circuit, such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), programmable controller(s), Graphics Processing Unit(s) (GPU(s)), digital signal processor(s) (DSP(s)), Coarse Grained Reduced precision architecture (CGRA(s)), image signal processor(s) (ISP(s)), etc.

The example media database 205 of the illustrated example of FIG. 2 stores the source IP and/or port of the media request, the destination IP and/or port of the media request, the start and end time of the media request, and the amount of data in the media request. The example media database 205 is implemented by any memory, storage device and/or storage disc for storing data such as, for example, flash memory, magnetic media, optical media, solid state memory, hard drive(s), thumb drive(s), etc. Furthermore, the data stored in the example media database 205 may be in any data format such as, for example, binary data, comma delimited data, tab delimited data, structured query language (SQL) structures, etc. While, in the illustrated example, the example media database 205 is illustrated as a single device, the example media database 205 and/or any other data storage devices described herein may be implemented by any number and/or type(s) of memories.

The example timing handler 206 of the illustrated example of FIG. 2 obtains the start and end time of the media requests from the example media streaming devices 102-106. In some examples, the start time of the media requests is the time the media streaming devices 102-104 requests media from the media provider(s) 114-116. In some examples, the end time of the media requests is the time when the media is presented on the example media streaming devices 102-106. In some examples, the example timing handler 206 is implemented by a hardware timer (e.g., mechanical timer, electromechanical timer, electronic timer, etc.). In further examples, the example timing handler 206 is implemented by a software timer.

The example data file generator 207 of the illustrated example of FIG. 2 generates a media network data file containing the source IP and/or port, the destination IP and/or port, the start time of the media request, the end time of the media request, and the amount of data in the media request. In some examples, the data file generator 207 generates Moving Picture Experts Group-4 (MPEG-4) files, MPEG-dash files, and/or Moving Picture Experts Group-2 (MPEG-2) files. The example data file generator 207 is implemented by a logic circuit, such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), programmable controller(s), Graphics Processing Unit(s) (GPU(s)), digital signal processor(s) (DSP(s)), Coarse Grained Reduced precision architecture (CGRA(s)), image signal processor(s) (ISP(s)), etc.

In operation, the monitoring enabled access point 108 receives media network data being buffered and/or streamed by the media streaming devices 102-106. The monitoring enabled access point 108 determines and stores the start and/or end times of the media requests by the media streaming devices 102-106. The monitoring enabled access point 108 interacts with the collection facility 110 via the network 112 to send the buffered media network data. In some examples, the monitoring enabled access point 108 calibrates the media data and/or generates a signature based on the calibrated media data before sending it to the collection facility 110.

Figure 3:
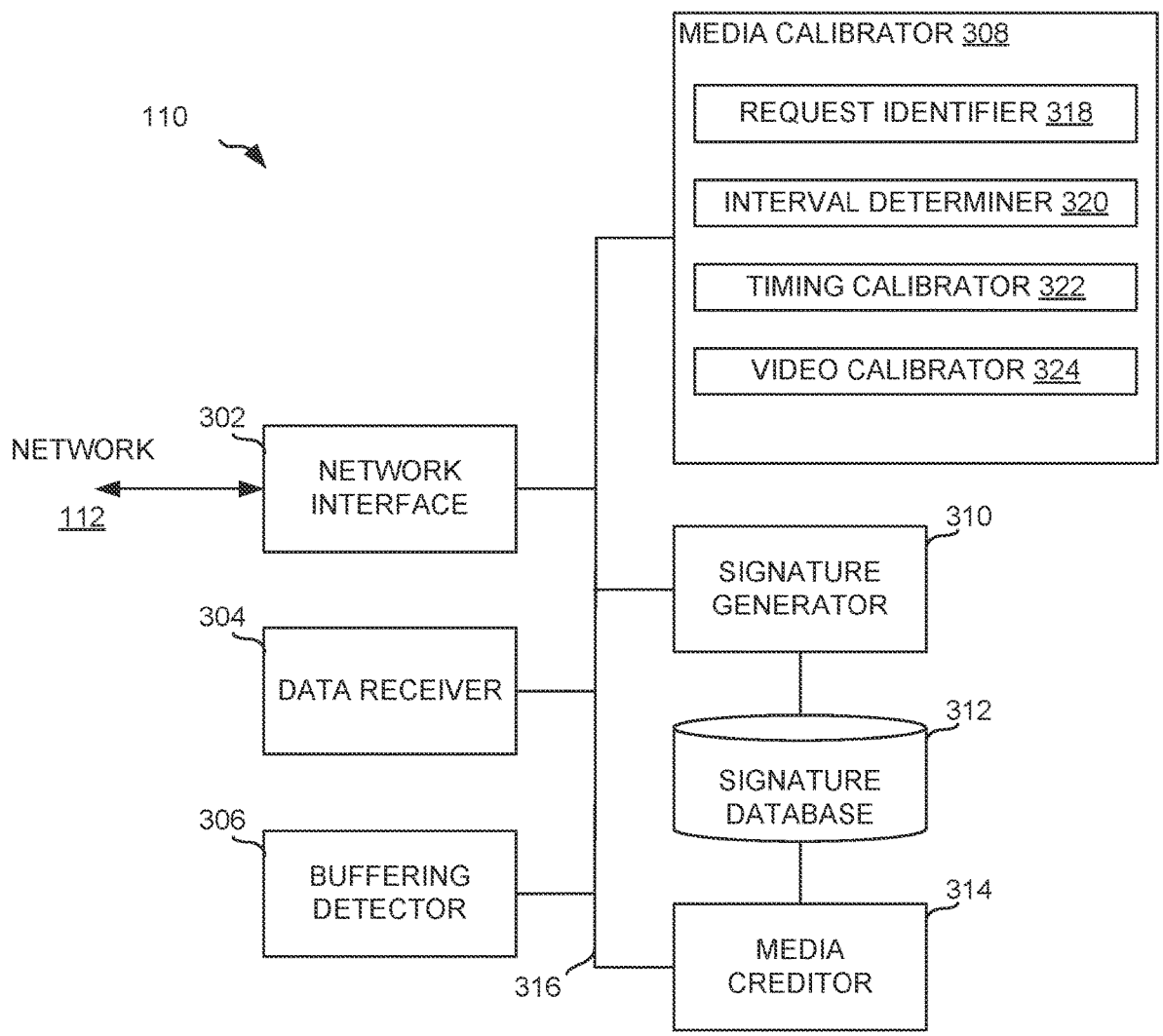
FIG. 3 is a schematic illustration of an example implementation of the collection facility of FIG. 1 to calibrate media, generate signatures, and identify media in accordance with teachings of this disclosure.

FIG. 3 is a schematic illustration of an example implementation of the collection facility 110 of FIG. 1 to detect buffering and calibrate media in accordance with teachings of this disclosure. The example collection facility 110 is equipped with an example network interface 302, an example data receiver 304, an example buffering detector 306, and an example media calibrator 308. The example collection facility 110 is also equipped with an example signature generator 310 with access to an example signature database 312. The example collection facility 110 is also configured with an example media creditor 314. The aforementioned structure and/or software (depending on the manner of implementation to track buffering video data) of FIG. 3 is communicatively connected (and/or interconnected) by an example collection facility bus 316. The example media calibrator 308 further includes an example request identifier 318, an example interval determiner 320, an example timing calibrator 322, and an example video calibrator 324.

The example network interface 302 of the illustrated example of FIG. 3 is communicatively connected to the example network 112 of FIG. 1. The example network interface 302 provides connection between the example collection facility 110 and the example network 112. In some examples, the example network interface 302 is implemented by hardware (e.g., a network interface card). In further examples, the example network interface 302 is implemented by software.

The example data receiver 304 of the illustrated example of FIG. 3 receives media network data files from the example monitoring enabled access point 108. For example, the example data receiver 304 receives media network data files (e.g., data files containing source and destination IP and/or port, start and end time of media requests, etc.) from the example monitoring enabled access point 108 via the example network 112. In some examples, the example data receiver 304 receives wireless radio signals (e.g., Wi-Fi signals). In some examples, the example data receiver 304 receives digital signals through wired media.

The example buffering detector 306 of the illustrated example of FIG. 3 detects whether the example media streaming devices 102-106 are buffering. In some examples, the buffering detector 306 detects buffering by determining that the media network data collected does not exhibit constant bitrate audio characteristics (e.g., the audio network data does not include audio network requests that are periodic in time). The example buffering detector 306 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example media calibrator 308 of the illustrated example of FIG. 3 creates a calibrated time-base based on audio network data and calibrates video network data (e.g., the start and end time of the video data requests determined by the example timing handler 206) using the calibrated time-base. As used herein, the "calibrated time-base" is the time period defined by the start and end time of the audio network data file request (e.g., the start and end times determined by the timing handler 206 of FIG. 2). That is, the calibrated time-base is the time period corresponding to the audio network data of the media network data file, including indications of the periodic audio requests. In examples disclosed herein, the example media calibrator 308 calibrates the media network data when buffering is present. Video network data (e.g., the start and end time of video data requests) may be calibrated using the calibrated time-base. In some examples, the video network data is expanded according to the periodic audio requests of the calibrated time base. That is, the video requests can be used to generate a signature even while the media is buffering due to the timing association of the periodic audio requests. The example media calibrator 308 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example signature generator 310 of the illustrated example of FIG. 3 generates a signature based on the calibrated media. In some examples, the signature generator 310 uses the amount of video network data (e.g., the size of the video data) to generate a signature. That is, the variable bitrate of video network data may be used to generate unique signatures of the media being streamed. In some examples, the example signature generator 310 stores the signature in the example signature database 312. The example signature generator 310 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example signature database 312 of the illustrated example of FIG. 3 stores signatures of media (e.g., the signature determined by the example signature generator 310) from the example media providers 114-118. In some examples, the example signature database 312 also stores media identifiers associated with the determined signatures and/or the associated media providers. Additionally or alternatively, the example signature database 312 may include reference signatures. For example, the reference signatures may be generated by an example AME. The example signature database 312 is implemented by any memory, storage device and/or storage disc for storing data such as, for example, flash memory, magnetic media, optical media, solid state memory, hard drive(s), thumb drive(s), etc. Furthermore, the data stored in the example signature database 312 may be in any data format such as, for example, binary data, comma delimited data, tab delimited data, structured query language (SQL) structures, etc.

The example media creditor 314 of the illustrated example of FIG. 3 credits media that is being streamed on the example media streaming devices 102-106. In the examples disclosed herein, the example media creditor 314 compares the signature generated by the signature generator 310 to the signatures stored in the signature database 312. In some examples, the media creditor 314 credits media when the signature matches a signature stored in the signature database 312. The example media creditor 314 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example request identifier 318 of the illustrated example of FIG. 3 identifies media network requests (e.g., audio network requests and/or video network requests) in the received media network data. In some examples, the request identifier 318 identifies a pair of consecutive media network requests. The example request identifier 318 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example interval determiner 320 of the illustrated example of FIG. 3 determines periodic time intervals for the calibrated time-base. In some examples, the interval determiner 320 identifies an expected time interval. As used herein, the "expected time interval" refers to the time interval between audio requests when buffering is not present. In some examples, the expected time interval may be determined based on the file type of the media network data. In some examples, the interval determiner 320 determines a buffered time interval between two audio requests. As used herein, the "buffered time interval" refers to the time interval between audio requests when buffering is present. The example interval determiner 320 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example timing calibrator 322 of the illustrated example of FIG. 3 calibrates audio data. That is, the timing calibrator 322 may expand (e.g., increase the time between audio data requests) for buffering media. In some examples, the timing calibrator 322 expands the time between audio data requests based on the difference between the expected time interval and the buffered time interval determined by the example interval determiner 320. In some examples, the time expansion of the audio data requests results in a calibrated time-base. The example timing calibrator 322 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example video calibrator 324 of the illustrated example of FIG. 3 calibrates video data. That is, the video calibrator 324 expands video data requests based on the calibrated time-base. In some examples, the video calibrator 324 uniformly distributes the video requests over the duration of the calibrated time-base. The example video calibrator 324 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

In operation, the example collection facility 110 communicates with the example monitoring enabled access point 108 via the network 112 to receive media data files (e.g., files generated by the data file generator 207 containing the source and destination IP addresses, the start and end time of media requests, and/or the amount of data) requested by the media streaming devices 102-106. The collection facility 110 detects whether buffering is present, and in some examples, calibrates video data using a calibrated time-base of audio data in response to buffering. The collection facility 110 may also generate a signature of the media data file and credit the media being streamed on the media streaming devices 102-106.

While example manners of implementing the streaming monitoring system of FIG. 1 is illustrated in FIGS. 2 and 3, one or more of the elements, processes and/or devices illustrated in FIGS. 2 and/or 3 may be combined, divided, re-arranged, omitted, eliminated and/or implemented in any other way. Further, the example network interface 202, the example data receiver 203, the example media request tracker 204, the example media database 205, the example timing handler 206, the example data file generator 207, the example network interface 302, the example data receiver 304, the example buffering detector 306, the example media calibrator 308, the example signature generator 310, the example signature database 312, the example media creditor 314, the example request identifier 318, the example interval determiner 320, the example timing calibrator 322, the example video calibrator 324 and/or, more generally, the example monitoring enabled access point 108 of FIG. 2 and/or the example collection facility 110 of FIG. 3 may be implemented by hardware, software, firmware and/or any combination of hardware, software and/or firmware. Thus, for example, any of the example network interface 202, the example data receiver 203, the example media request tracker 204, the example media database 205, the example timing handler 206, the example data file generator 207, the example network interface 302, the example data receiver 304, the example buffering detector 306, the example media calibrator 308, the example signature generator 310, the example signature database 312, the example media creditor 314, the example request identifier 318, the example interval determiner 320, the example timing calibrator 322, the example video calibrator 324 and/or, more generally, the example monitoring enabled access point 108 and/or the example collection facility 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network interface 202, the example data receiver 203, the example media request tracker 204, the example media database 205, the example timing handler 206, the example data file generator 207, the example network interface 302, the example data receiver 304, the example buffering detector 306, the example media calibrator 308, the example signature generator 310, the example signature database 312, the example media creditor 314, the example request identifier 318, the example interval determiner 320, the example timing calibrator 322, the example video calibrator 324 is/are hereby expressly defined to include a non-transitory computer readable storage device or storage disk such as a memory, a digital versatile disk (DVD), a compact disk (CD), a Blu-ray disk, etc. including the software and/or firmware. Further still, the example monitoring enabled access point 108 of FIG. 2 and/or the example collection facility 110 of FIG. 3 may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
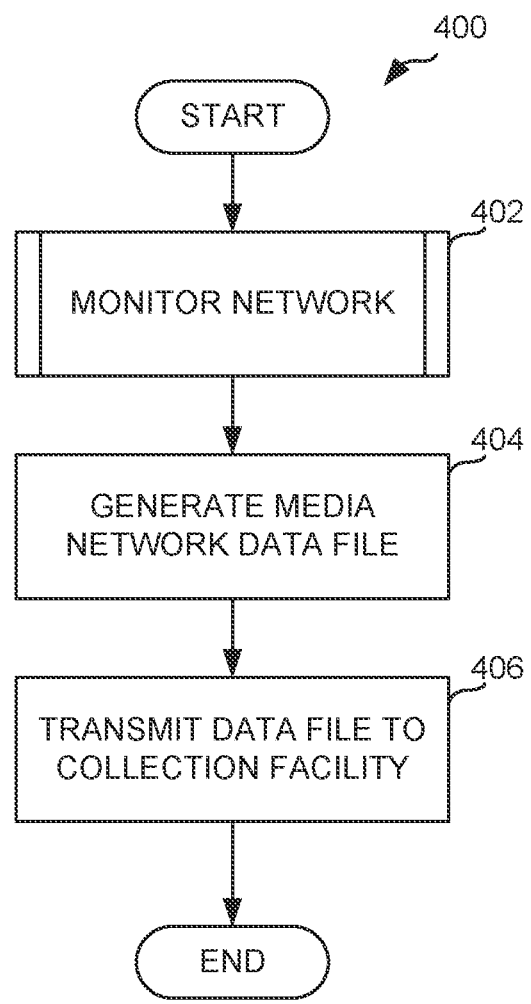
FIG. 4 is a flowchart representative of machine-readable instructions which may be executed to implement the example monitoring enabled access point of FIG. 2 to perform in-home sniffing of media.
Figure 5:
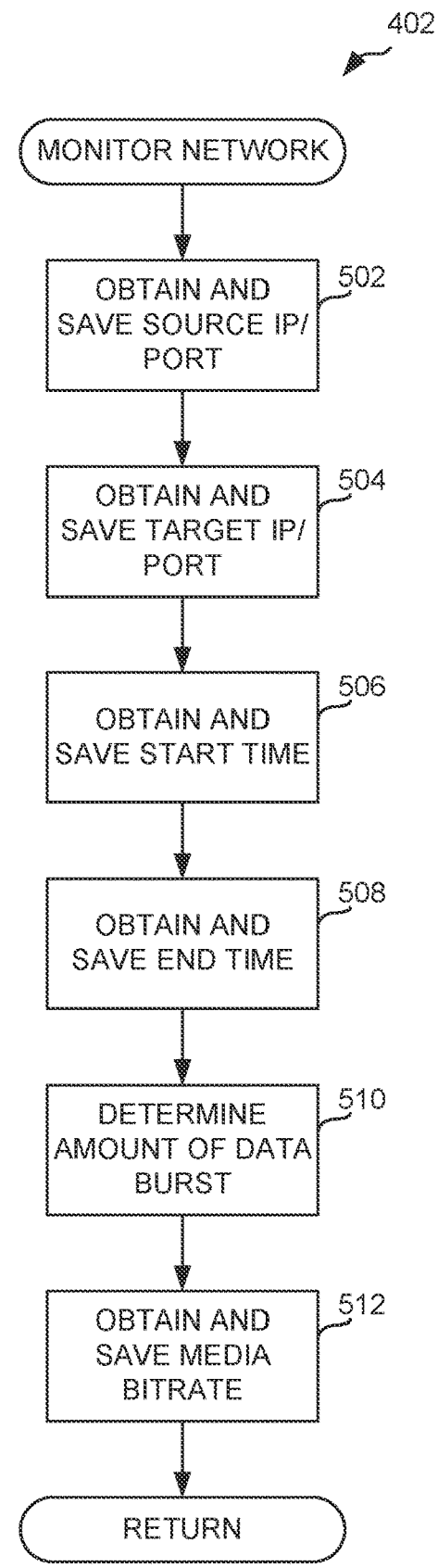
FIG. 5 is a flowchart representative of example machine readable instructions which may be executed to implement the example monitoring enabled access point of FIG. 2 to perform in-home sniffing.

Flowcharts representative of example hardware logic, machine readable instructions, hardware implemented state machines, and/or any combination thereof for implementing the monitoring enabled access point 108 of FIG. 2 are shown in FIGS. 4 and 5. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4 and 5, many other methods of implementing the example monitoring enabled access point 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 6:
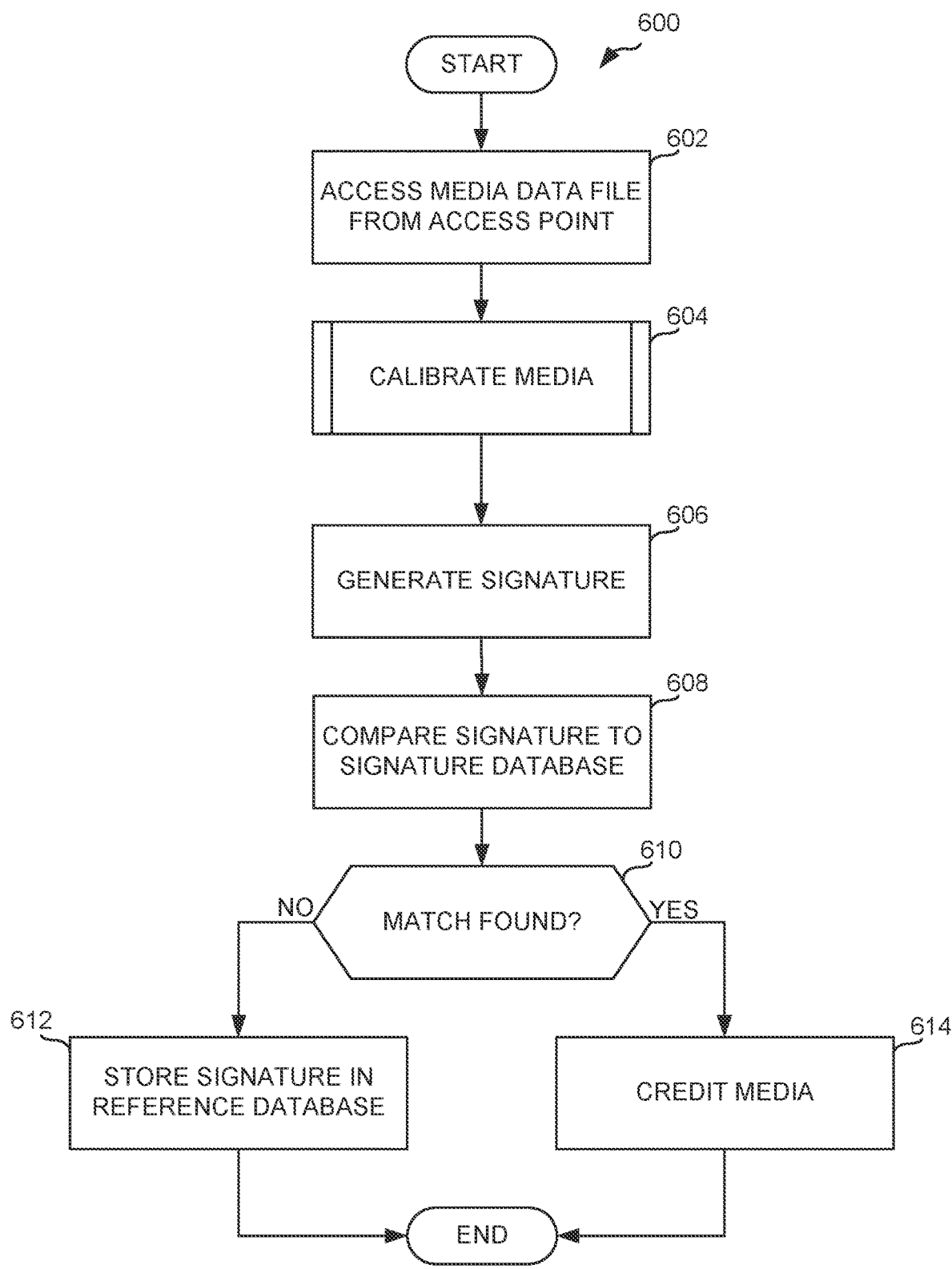
FIG. 6 is a flowchart representative of machine-readable instructions which may be executed to implement the example collection facility of FIG. 3 to calibrate and identify media.
Figure 7:
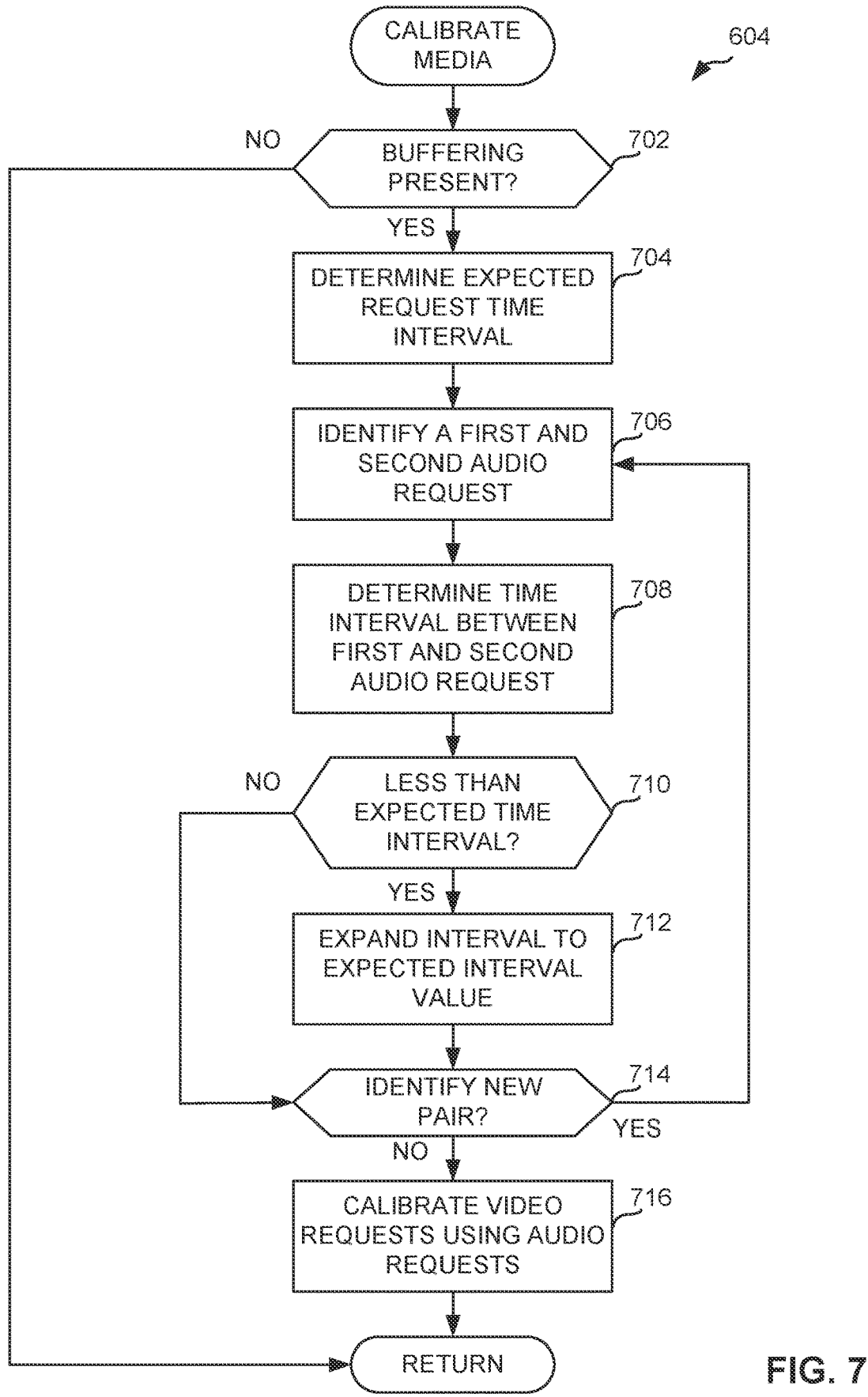
FIG. 7 is a flowchart representative of example machine readable instructions which may be executed to implement the example collection facility of FIG. 3 to calibrate media.

Flowcharts representative of example hardware logic, machine readable instructions, hardware implemented state machines, and/or any combination thereof for implementing the collection facility 110 of FIG. 3 are shown in FIGS. 6 and 7. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6 and 7, many other methods of implementing the example collection facility 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 describes example machine readable instructions which may be executed to implement the example monitoring enabled access point 108 of FIG. 1 and/or 2 to perform in-home sniffing of media. The example process 400 of the illustrated example of FIG. 4 begins when the example media streaming device(s) 102-106 sends a media request (e.g., a HTTPS API call) to the example media provider(s) 114-118. In some examples, the example media streaming devices 102-106 use HTTP Live Streaming (HLS). The example monitoring enabled access point 108 monitors the in-home network to collect network data about communications (e.g., media data file requests). (Block 402). The example in-home sniffing process includes obtaining a source IP and/or port, a destination IP and/or port, obtaining a start time and end time of media requests, and determining the amount of data in the requests (e.g., bitrate). An example implementation of the in-home sniffing process 402 of FIG. 4 is described in further detail in connection with FIG. 5.

The example data file generator 207 generates a media network data file. (Block 404). In some examples, the media network data file includes the source IP and/or port, the destination IP and/or port, the start and end time of media requests, and the amount of data in the request. In some examples, the media network data file is a MPEG-4 file containing video, audio, and metadata frames interleaved in data containers. In further examples, the media is accessed via HLS and network data files are transmitted as MPEG-2 files with video and audio data interleaved. The example network interface 202 transmits the media network data file to the example collection facility 110. (Block 406).

FIG. 5 describes example machine readable instructions which may be executed to implement the example monitoring enabled access point 108 of FIGS. 1 and/or 2 to monitor the example network 112. The example media request tracker 204 obtains and saves the source IP and/or port of the media request. (Block 502). The example media request tracker 204 also obtains and saves the destination IP and/or port of the media request. (Block 504). In examples disclosed herein, the source and destination IP address are wide area network (WAN) IP addresses. In some examples, the source and destination IP addresses are LAN IP addresses. The source and destination IP and/or port of the media requests are saved to the example media database 205. The example timing handler 206 obtains and saves the start time of the media request. (Block 506). The example timing handler 206 also obtains and saves the end time of the media request. (Block 508). The start and end time of the media requests are saved to the example media database 205. The example media request tracker 204 determines the amount of data in the burst. (Block 510). In the examples disclosed herein, the data includes both video and audio network data. In some examples, the video and audio data are digitized into frames. The example media request tracker 204 determines and saves the bitrates of the video and audio requests to the example media database 205. (Block 512). In the examples disclosed herein, the video bitrate is variable and depends on the video complexity of the scene. The example audio bitrate is constant, thus creating periodic audio data requests. The example monitoring enabled access point 108 returns to block 404 of process 400 of FIG. 4.

FIG. 6 describes example machine readable instructions which may be executed to implement the example collection facility 110 of FIGS. 1 and/or 3 to calibrate and identify media. The example collection facility 110 accesses the media network data file from the example monitoring enabled access point 108. (Block 602). In the examples disclosed herein, the media network data file is received via the example data receiver 304. The example media calibrator 308 calibrates the media. (Block 604). In some examples, the example media calibrator 308 calibrates the video network data (e.g., the video data start and end time) using the audio network data requests, which are often periodic with a constant bitrate. An example implementation of the media calibration process 604 of FIG. 6 is described in further detail in connection with FIG. 7.

The example signature generator 310 generates the time-based signature based on the calibrated video network data. (Block 606). The time-based signature can be used for media matching and identification while the media is still buffering. In some examples, the example signature generator 310 stores the signature in the example signature database 312. The example media creditor 314 compares the calculated signature generated in block 606 to the signatures saved in the signature database 312. (Block 608). In examples disclosed herein, the example media creditor 314 searches through the example signature database 312. In some examples, the example media creditor 314 compares the calculated signature to each signature saved in the example signature database 312 to determine a match. In further examples, any suitable searching technique can be used to search through the example signature database 312.

The example media creditor 314 determines if the calculated signature matches any signature in the example signature database 312. (Block 610). In examples disclosed herein, the determined signature is compared to signatures saved in the example signature database 312. In examples disclosed herein, a "match" is determined if a signature match threshold is met (e.g., a match score is greater than or equal to a threshold, a difference is less than or equal to a threshold, etc.). In some examples, any signature match threshold may be user defined or pre-defined. The signature match threshold provides a tolerance for matching (e.g., to operate in the presence of variable bitrate streaming, which may produce slightly different signatures for the same media being viewed).

If the example media creditor 314 determines there is no signature match found (e.g., the signature match threshold was not met and block 610 returns a result of NO), the example media creditor 314 stores the signature in the signature database 312. (Block 612). In some examples, there is no matching signature saved in the example signature database 312 because the media being viewed is new (e.g., a new season of television shows). In some examples, the example media creditor 314 saves the signature in the example signature database 312 for future matching. Additionally or alternatively, the example media creditor 314 may flag the unknown signature for further analysis (e.g., by an analyst, AME, etc.). If the example media creditor 314 determines there is a signature match found (e.g., the signature match threshold was matched or exceeded and block 610 returns a result of YES), the example media creditor 314 credits the corresponding media of the matching signature in the example signature database 312 as being viewed. (Block 614). The program 600 ends. In some examples, the program 600 ends when there are no more HTTPS API calls (e.g., media is no longer being streamed).

FIG. 7 describes example machine readable instructions which may be executed to implement the example media calibrator 308 to calibrate video network data. The example buffering detector 306 determines if there is buffering present. (Block 702). In some examples, the example buffering detector 306 determines buffering is present if the media network data collected does not exhibit constant bitrate audio characteristics. If the example buffering detector 306 determines there is no buffering (e.g., block 702 returns a result of NO), the example media calibrator 308 returns to block 606 of process 600 of FIG. 6. If the example buffering detector 306 determines there is buffering present (e.g., block 702 returns a result of YES), the example request identifier 318 determines the expected time interval of the audio network requests. (Block 704). The example request identifier 318 identifies a first audio request and a second audio request of the media network requests. (Block 706).

The example interval determiner 320 determines a first time interval between the first audio request and the second audio request. (Block 708). In some examples, the interval determiner 320 determines the difference in time between the first audio request and the second audio request. The example interval determiner 320 compares the first time interval (e.g., the time interval between the first audio request and the second audio request) to the expected time interval. (Block 710). If the example interval determiner 320 determines that the first time interval is not less than the expected time interval (e.g., block 710 returns a result of NO), the interval determiner 320 proceeds to block 714. If the example interval determiner 320 determines that the first time interval is less than the expected time interval (e.g., block 710 returns a result of YES), the example timing calibrator 322 expands the first time interval to match the expected time interval. (Block 712). In some examples, the timing calibrator 322 determines the time difference between the expected time interval and the first time interval, and adjusts the second audio request according to this time difference.

The example request identifier 318 determines whether to identify another pair of audio requests. (Block 714). If the example request identifier 318 determines to examine another pair of audio requests (e.g., block 714 returns a result of YES), the example request identifier 318 returns to block 706. In some examples, the example request identifier 318 determines to examine another pair of audio requests until all audio requests have been analyzed. If the example request identifier 318 determines not to examine another pair of audio requests (e.g., block 714 returns a result of NO), the example video calibrator 324 calibrates video requests using audio requests. (Block 716). In some examples, the example video calibrator 324 uniformly distributes video requests of the media network data over the calibrated time-base. The example media calibrator 308 returns to block 606 of the program 600 of FIG. 6.

Figure 8:
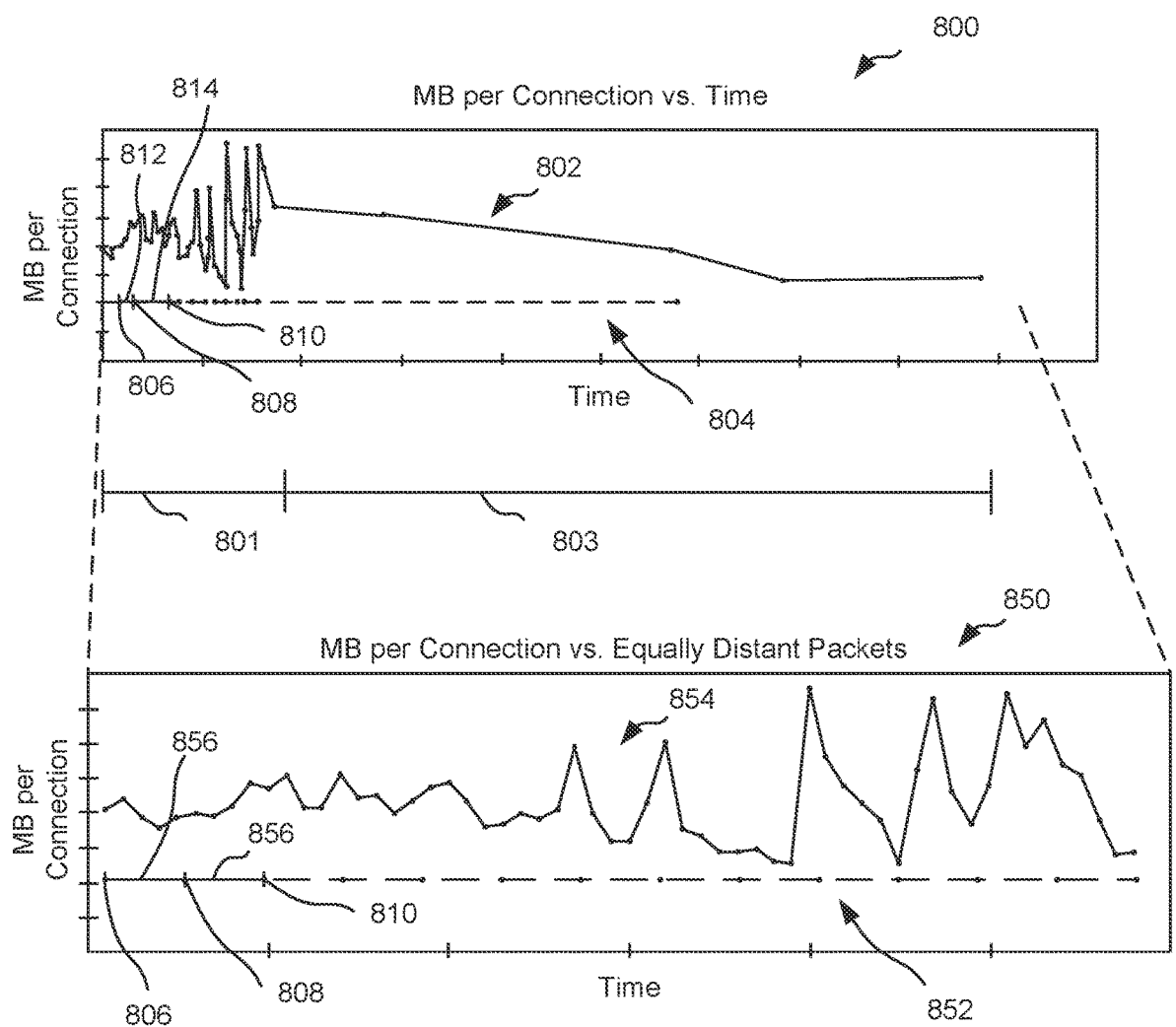
FIG. 8 is an example illustration of uncalibrated and calibrated variable bitrate media network data.

FIG. 8 is an example illustration of uncalibrated and calibrated variable bitrate media network data. The illustrated example of FIG. 8 includes uncalibrated media network data 800 (e.g., media network data collected by the example monitoring enabled access point 108). The example uncalibrated media network data 800 includes uncalibrated video network data 802 and uncalibrated audio network data 804. In the illustrated example of FIG. 8, the uncalibrated media network data 800 reflects buffering throughout the first time interval 801 compared to the second time interval 803 (e.g., media not buffering throughout the second time interval 803). The uncalibrated audio network data 804 includes a first audio request 806, a second audio request 808, and a third audio request 810. In some examples, the first audio request 806, the second audio request 808, and the third audio request 810 include the file size per request (e.g., megabytes per connection). In the illustrated example, the first audio request 806 and the second audio request 808 are separated by a first uncalibrated audio time interval 812. The second audio request 808 and the third audio request 810 are separated by a second uncalibrated audio time interval 814. In the illustrated example, the first uncalibrated audio time interval 812 is shorter in duration compared to the second uncalibrated audio time interval 814.

The illustrated example of FIG. 8 further includes calibrated media network data 850. In some examples, the calibrated media network data 850 is generated by the process 700 of FIG. 7. The calibrated media network data 850 includes calibrated audio network data 852. For example, the calibrated audio network data 852 includes the first audio request 806, the second audio request 808, and the third audio request 810. In contrast to the uncalibrated audio network data 804, the first audio request 806 and the second audio request 808 are separated by the expected time interval (e.g., the calibrated time interval 856). In the illustrated example of FIG. 8, all of the audio requests in the calibrated audio network data 852 are separated by the expected time interval. That is, the second audio request 808 and the third audio request 810 are also separated by the calibrated time interval 856. The calibrated video network data 854 illustrates video requests uniformly distributed over the calibrated time-base (e.g., the duration of the calibrated audio network data 852).

Figure 9:
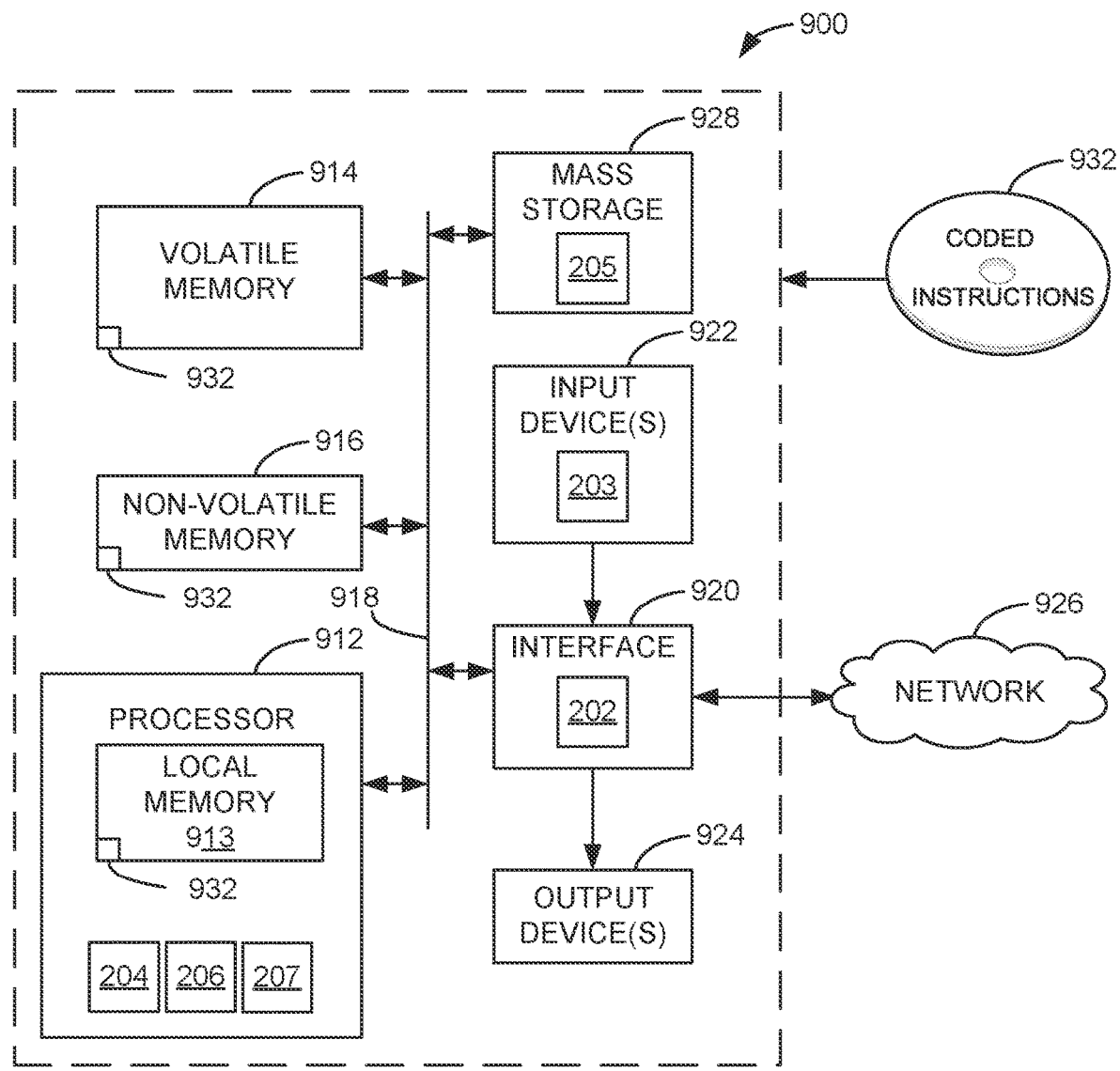
FIG. 9 is a block diagram of an example processing platform structured to execute the instructions of FIGS. 4 and 5 to implement the example monitoring enabled access point of FIG. 2.

FIG. 9 is a block diagram of an example processor platform 900 structured to execute the instructions of FIGS. 4 and 5 to implement the example monitoring enabled access point 108 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media request tracker 204, the example timing handler 206, and the example data file generator 207.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 4 and 5 may be stored in the mass storage device 928, in the volatile memory 914, in the non-volatile memory 916, and/or on a removable non-transitory computer readable storage medium such as a CD or DVD.

Figure 10:
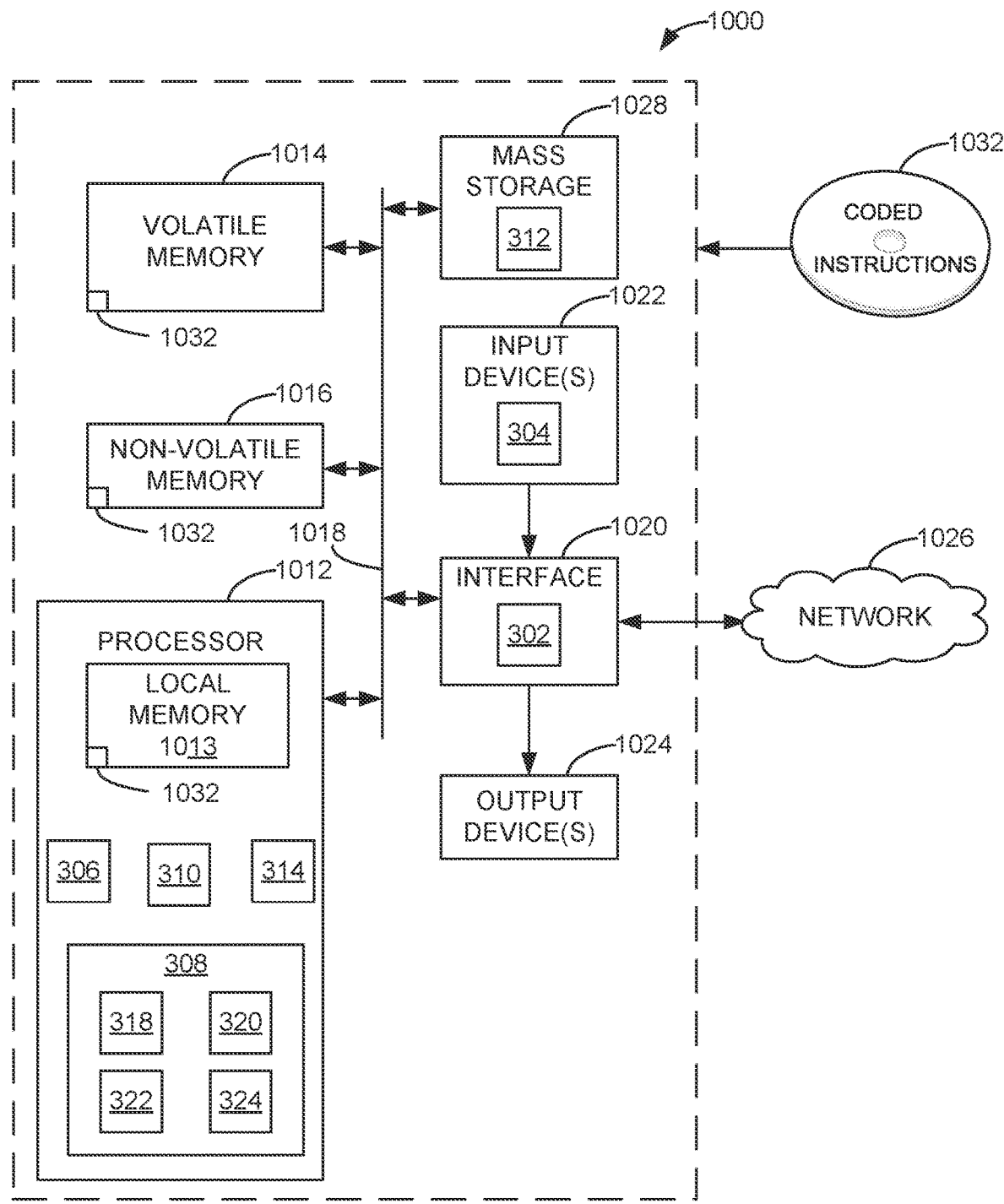
FIG. 10 is a block diagram of an example processing platform structured to execute the instructions of FIGS. 6 and 7 to implement the example collection facility of FIG. 3.

FIG. 10 is a block diagram of an example processor platform 1000 structured to execute the instructions of FIGS. 6 and 7 to implement the example collection facility 110 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data receiver 304, the example buffering detector 306, the example media calibrator 308, the example signature generator 310, the example media creditor 314, the example request identifier 318, the example interval determiner 320, the example timing calibrator 322, and the example video calibrator 324.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6 and 7 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that facilitate communication between a monitoring enabled access point and a collection facility of a streaming media monitoring system to monitor media even when encryption and buffering techniques are employed. In some examples, dynamic communicative processes disclosed herein allow for media crediting during buffering of media being streamed. For example, the media network data (e.g., the audio network data and the video network data) are calibrated. That is, the variable bitrate video network data is calibrated based on the constant bitrate audio network data. The calibrated video network data may be used to generate a unique signature, which can then be used to credit the media being streamed. The disclosed methods, apparatus and articles of manufacture improve the efficiency of using a computing device by enabling minute-to-minute tracking of buffering media. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system for monitoring streaming media, the computing system comprising:
    a processor; and
    memory having stored thereon machine-readable instructions that, when executed by the processor, cause performance of operations comprising:
        calibrating variable bitrate video data by calibrating first time intervals associated with video requests in the variable bitrate video data of a media stream based on second time intervals associated with audio requests in constant bitrate audio data of the media stream, wherein the second time intervals are generated by calibrating buffered time intervals to match expected time intervals, wherein the buffered time intervals correspond to time intervals between the audio requests when the media stream is buffered, and wherein the expected time intervals correspond to time intervals between the audio requests when the media stream is not buffered;
        generating a signature representative of the media stream based on the calibrated variable bitrate video data;
        comparing the signature to a signature database to identify a matching signature in the signature database; and
        crediting media corresponding to the matching signature as being viewed.

2. The computing system of claim 1, the operations further comprising,
    comparing the matching signature to a threshold, the threshold including a match score,
    wherein crediting the media based on the comparison of the matching signature to the threshold.

3. The computing system of claim 1, the operations further comprising:
    identifying at least one of a source internet protocol (IP), a source port, a destination IP, a destination port, a start time of the media stream, an end time of the media stream, and a bitrate of the media stream; and
    idenfying the video requests based on at least one of the source IP, source port destination IP, destination port, and bitrate of the media stream.

4. A method to monitor streaming media, the method comprising:
    calibrating variable bitrate video data by calibrating first time intervals associated with video requests in the variable bitrate video data of a media stream based on second time intervals associated with audio requests in constant bitrate audio data of the media stream, wherein the second time intervals are generated by calibrating buffered time intervals to match expected time intervals, wherein the buffered time intervals correspond to time intervals between the audio requests when the media stream is buffered, and wherein the expected time intervals correspond to time intervals between the audio requests when the media stream is not buffered;
    generating a signature representative of the media stream based on the calibrated variable bitrate video data;
    comparing the signature to a signature database to identify a matching signature in the signature database; and
    crediting media corresponding to the matching signature as being viewed.

5. The method of claim 4, further comprising:
    comparing the matching signature to a threshold, the threshold including a match score,
    wherein crediting the media is based on the comparison of the matching signature to the threshold.

6. The method of claim 4, further comprising,
    identifying at least one of a source internet protocol (IP), a source port, a destination IP, a destination port, a start time of the media stream, an end time of the media stream, and a bitrate of the media stream; and
    identifying the video requests based on at least one of the source IP, source port, destination IP, destination port, and bitrate of the media stream.

7. A non-transitory computer readable storage medium comprising instructions that, when executed, cause at least one processor to perform operations comprising:
    calibrating variable bitrate video data by calibrating first time intervals associated with video requests in the variable bitrate video data of a media stream based on second time intervals associated with audio requests in constant bitrate audio data of the media stream, wherein the second time intervals are generated by calibrating buffered time intervals to match expected time intervals, wherein the buffered time intervals correspond to time intervals between the audio requests when the media stream is buffered, and wherein the expected time intervals correspond to time intervals between the audio requests when the media stream is not buffered;
generating a signature representative of the media stream based on the calibrated variable bitrate video data;
comparing the signature to a signature database to identify a matching signature in the signature database; and
crediting media corresponding to the matching signature as being viewed.

8. The non-transitory computer readable storage medium of claim 7, the operations further comprising;
comparing the matching signature to a threshold, the threshold including a match score,
wherein crediting the media is based on the comparison of the matching signature to the threshold.

9. The computing system of claim 1, wherein the variable bitrate video data comprises video frames of the media stream that are encoded in a variable bitrate, and wherein the constant bitrate audio data comprises audio frames of the media stream that are encoded in a constant bitrate.

10. The computing system of claim 1, wherein:
calibrating the first time intervals of the variable bitrate video data of the media stream based on the second time intervals associated with the audio requests in the constant bitrate audio data of the media stream comprises expanding the first time intervals based on the second time intervals, and
the calibrated variable bitrate video data comprises the expanded first time intervals.

11. The computing system of claim 1, wherein:
calibrating the first time intervals of the variable bitrate video data of the media stream based on the second time intervals associated with the audio requests in the constant bitrate audio data of the media stream comprises uniformly distributing the video requests over a duration of the constant bitrate audio data.

12. The method of claim 4, wherein the variable bitrate video data comprises video frames of the media stream that are encoded in a variable bitrate, and wherein the constant bitrate audio data comprises audio frames of the media stream that are encoded in a constant bitrate.

13. The method of claim 4, wherein:
calibrating the first time intervals of the variable bitrate video data of the media stream based on the second time intervals associated with the audio requests in the constant bitrate audio data of the media stream comprises expanding the first time intervals based on the second time intervals, and
the calibrated variable bitrate video data comprises the expanded first time intervals.

14. The method of claim 4, wherein:
calibrating the first time intervals of the variable bitrate video data of the media stream based on the second time intervals associated with the audio requests in the constant bitrate audio data of the media stream comprises uniformly distributing the video requests over a duration of the constant bitrate audio data.

15. The non-transitory computer readable storage medium of claim 7, wherein the variable bitrate video data comprises video frames of the media stream that are encoded in a variable bitrate, and wherein the constant bitrate audio data comprises audio frames of the media stream that are encoded in a constant bitrate.

16. The non-transitory computer readable storage medium of claim 7, wherein:
calibrating the first time intervals of the variable bitrate video data of the media stream based on the second time intervals associated with the audio requests in the constant bitrate audio data of the media stream comprises expanding the first time intervals based on the second time intervals, and
the calibrated variable bitrate video data comprises the expanded first time intervals.

17. The non-transitory computer readable storage medium of claim 15, wherein:
calibrating the first time intervals of the variable bitrate video data of the media stream based on the second time intervals associated with the audio requests in the constant bitrate audio data of the media stream comprises uniformly distributing the video requests over a duration of the constant bitrate audio data.

* * * * *